US007027445B1

(12) United States Patent
Sunada et al.

(10) Patent No.: US 7,027,445 B1
(45) Date of Patent: Apr. 11, 2006

(54) APPARATUS AND METHOD FOR FINDING THE LONGEST MATCHING PREFIX IN A ROUTER

(75) Inventors: Dwight Sunada, Palo Alto, CA (US); Xuejun Yuan, San Jose, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/580,022

(22) Filed: May 26, 2000

(51) Int. Cl.
*H04L 12/56* (2006.01)
(52) U.S. Cl. .................................. 370/395.31
(58) Field of Classification Search ................ 370/389, 370/392, 395.31, 395.32, 395.7, 395.71, 370/395.72, 428, 429
See application file for complete search history.

(56) References Cited

U.S. PATENT DOCUMENTS 6,065,064 A * 5/2000 Satoh et al. ................. 709/249
6,449,256 B1 * 9/2002 Varghese et al. ............. 370/238
6,570,877 B1 * 5/2003 Kloth et al. ................. 370/392
6,614,789 B1 * 9/2003 Yazdani et al. .............. 370/392
6,625,662 B1 * 9/2003 Satoh et al. ................. 709/250
6,711,623 B1 * 3/2004 Furukawa et al. ........... 709/249

OTHER PUBLICATIONS

GUPTA, "Routing Lookups in Hardware at Memory Access Speeds", Proceedings of the IEEE Infocom 98, Apr. 1998.

* cited by examiner

*Primary Examiner*—Kwang Bin Yao
(74) *Attorney, Agent, or Firm*—Park, Vaughan & Fleming LLP (57) ABSTRACT

An apparatus and method for reducing a number of matched entries to more relevant matched entries. In routers, a destination Internet Protocol address of an incoming packet is matched to a router table of Internet Protocol address prefixes, yielding multiple matching entries in the router table. Less relevant matching entries that contain shorter Internet Protocol address prefixes are automatically removed, leaving only the entry including a longest matching prefix.

12 Claims, 6 Drawing Sheets

APPARATUS AND METHOD FOR FINDING THE LONGEST MATCHING PREFIX IN A ROUTER

FIELD

This invention relates generally to routers, and more specifically to a method and apparatus for finding the longest matching prefix in a router.

BACKGROUND

A router is a networking device that forwards an incoming packet to a targeted destination. The incoming packet includes a destination IP (internet Protocol) address, which is matched against a list of entries in a table. Each entry includes an IP address prefix, a mask, and a port number. For every entry in the router table, the prefix is compared with the result of AND'ing the destination IP address with the mask. If an entry has a matching prefix, the entry supplies the port number, which indicates the next hop of the packet.

Alternatively, table entries can express the prefix and the mask in a combination called a trit representation. A trit includes an information state of "x" in addition to "1" and "0". The state of "x" indicates a state of "don't care." A trit representation may include several trits.

A specific example of a table follows:

| Prefix   | Mask            | trit representation | Port |
|----------|-----------------|---------------------|------|
| 10.1.3.1 | 255.255.255.255 | 10.1.3.1            | 5    |
| 10.1.3.0 | 255.2055.255.0  | 10.1.3.x            | 4    |
| 10.1.1.0 | 255.255.255.0   | 10.12.1.x           | 3    |
| 10.1.0.0 | 255.255.0.0     | 10.1.x.x            | 2    |
| 10.0.0.0 | 255.0.0.0       | 10.x.x.x            | 1    |

A destination IP address can match multiple entries of the table. For example, a destination IP address of 10.1.1.7 matches the bottom three entries in the above table. If the table returns multiple matching entries for the destination address, the correct entry is the entry including the longest matching prefix. In the previous example, the longest matching prefix is 10.1.1.0 (the trit representation 10.1.1.x).

One goal of router design is to efficiently find the entry including the longest matching prefix from multiple matching entries. The IP address has 32 bits, and the IP address prefix in CIDR (Classless InterDomain Routing) for Ipv4 (Internet Protocol Version 4) ranges in length anywhere from 1 bit to 32 bits. Thus, the destination IP address may match as many as 32 entries of the table. A router should be able to determine the entry including the longest matching prefix from as many as 32 matching entries.

One approach is to construct the table such that the table includes the entries in order, for example, starting from entries including prefixes with 32 relevant bits (i.e., a mask of 128.0.0.0). The entry including the longest matching prefix must then be the matching entry positioned earliest in the table.

One problem with this approach is that entries must be stored in predetermined positions. This leads to wasted memory space. For example, memory dedicated to entries with 32 relevant bits may be underutilized, and memory dedicated to entries with 31 relevant bits may be full; this represents a poor allocation of memory resources. Additionally, the process of updating entries may be cumbersome. For example, if memory dedicated to entries with 31 bits is full, and an additional entry of a new prefix needs to be entered into the table, then memory space must be created elsewhere, and the memory allocated to the entries with 31 bits needs to be redefined, to keep intact the scheme of ordering entries.

Therefore, what is needed is a better solution to the problem of finding an entry including the longest matching prefix from multiple matching entries.

SUMMARY

To overcome the limitations described above, and to overcome other limitations that will become apparent upon reading and understanding the present specification, disclosed is a system and method for finding the longest matching prefix in a router table for a destination IP address. In one embodiment, the system and method include a content addressable memory storing IP address prefixes, and an encoder coupled to the memory which finds the longest matching prefix. The IP address prefixes may be stored in the memory in a length independent manner. Each entry of an IP address prefix has a degree of relevance and either a matching status or a non-matching status. The system and method for reducing a number of multiple matching entries is achieved by changing a matching status of one or more less relevant entries in the multiple matching entries to a non-matching status. Less relevant matching entries that contain shorter IP address prefixes are automatically removed, leaving only the entry including the longest matching prefix.

DETAILED DESCRIPTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of those teachings without deviating from the spirit or scope of the invention.

Figure 1:
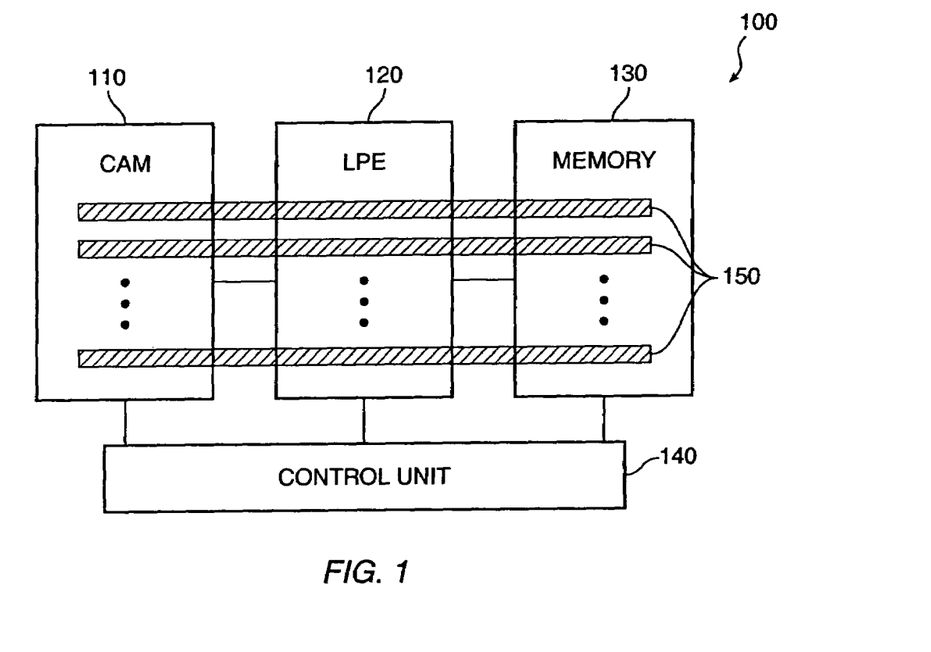
FIG. 1 is a block diagram showing a system including a length-based priority encoder.

FIG. 1 shows an exemplary; system 100, which may be a router. The system 100 includes a CAM (content addressable memory) 110, an LPE (length based priority encoder) 120, and a memory 130, a control unit 140, and group of entries 150. An entry of the group of entries 150 includes information found in the CAM 110, the LPE 120, and the memory 130. In one embodiment of system 100 operating as a router, the entry stores an IP address prefix and mask (or a combination of the prefix and mask known also as a trit representation) in the CAM 110; a code called an SLE(special length encoding) in the LPE 120; and a port number associated with the IP address prefix in the memory 130. The CAM 110 stores the IP address prefixes and masks of the group of entries 150. These entries may be stored in a random order. For example, these entries may be stored in a length independent manner. A destination IP address of a packet is sent to the CAM 110. The CAM 110 compares the destination IP address with all of the prefixes and masks stored in the CAM 110 to a find matching entries. Then the CAM 110 sends one or more signals indicating entries having a matching status to the LPE 120. The LPE 120 includes in the SLE information that signifies the degree of relevance of the entries having the matching status. The LPE 120 finds more relevant matches by removing less relevant matches from consideration, changing the matching status of the less relevant matches to a non-matching status. Then the LPE 120 sends one or more signals to the memory 130 indicating matching entries having greater relevance. In one embodiment, the matching entry having the greatest relevance is indicated to the memory 130. The output of the system 100 includes contents of the memory 130, such as a port number, corresponding to the match having the greatest relevance. The control unit 140 performs administrative functions.

An entry of the group of entries 150 has some degree of relevance depending on the number of "1"s in the mask of the entry. For example, given two entries:

a first entry: prefix 10.1.1.0, mask 255.255.255.0, trit representation 10.1.1.x, port 3 a second entry: prefix 10.1.0.0, mask 255,255.0.0, trit representation 10.1.x.x, port 2 the first entry has a greater degree of relevance and the second entry has a lesser degree of relevance, because the first entry has more relevant binary numbers in the prefix corresponding to more "1"s in the mask or fewer "don't care's" in the trit representation. The degree of relevance is also stored in the SLE of the LPE 120. Given a packet with a destination IP address, such as 10.1.1.1, that results in both the first entry and the second entry of the preceding example sending a signal indicating a matching status to the LPE 120, the LPE 120 changes the matching status of the less relevant second entry to a non-matching status. As the only matching entry that remains, the first entry is found to include the longest matching prefix. The matching status of the first entry is communicated to the memory 130, and the port number 3 stored in the memory 130 is the output of the system 100.

In other embodiments, an entry of the group of entries 150 includes information, a degree of relevance characterizing the information, and output information associated with the information. An input is compared with the stored information. Signals are sent to indicate entries including information that match the input. After processing the degrees of relevance characterizing the matching entries, matching entries having lesser degrees of relevance become non-matching entries. The degree of relevance can reflect a number of significant digits, searching criteria for an input, or any other characterization of an entry. Finally, the system 100 communicates output information associated with remaining matching entries. The system 100 may any device that finds a most relevant entry or most relevant entries for a given input.

In other embodiments, the LPE 120 reduces a number of matching entries to one or more matching entries of greater relevance.

In other embodiments, the LPE 120 reduces a number of matching entries to one or more matching entries of lesser relevance, for example, by identifying entries that should be removed.

Figure 2:
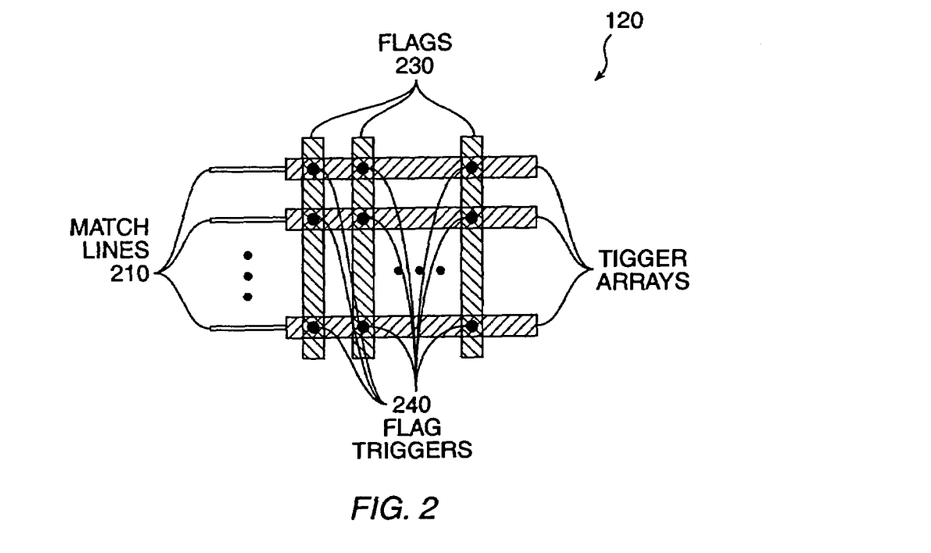
FIG. 2 is a schematic diagram showing the length-based priority encoder of FIG. 1, including flag triggers and flags.

FIG. 2 shows an exemplary LPE 120, which includes a plurality of trigger arrays 220 and a plurality of flags 230. The LPE 120 receives a plurality of match lines 210. Each of the plurality of match lines 210 carries either a matching signal or a non-matching signal from the CAM 110 indicating whether or not the match line leads from an entry with an IP address prefix held in the CAM 110 that matches the destination IP address of a packet. A match line of the plurality of match lines 210 feeds the matching status or non-matching status of an entry into a trigger array of the plurality of trigger arrays 220. Each trigger array of the plurality of trigger arrays 220 includes a plurality of flag triggers 240. Each flag trigger has either a triggering status or a non-triggering status. The plurality of flag triggers 240 holds the SLE which characterizes the entry represented by the match line feeding into the plurality of flag triggers 240. The SLE includes a pattern of bits indicating the degree of relevance of the entry. Each bit of the SLE is held in a flag trigger of the plurality of flag triggers 240. One example of a flag trigger embodiment is explained below in the discussion for FIG. 3. Some examples of SLEs for particular trit representations follow:

| Trit representation | SLE |
| --- | --- |
| 10.1.3.1 | 0xFFFFFFFF |
| 10.1.3.x | 0x00FFFFFF |
| 10.1.1.x | 0x00FFEEFF |
| 10.1.x.x | 0x0000FFFF |
| 10.x.x.x | 0x000000FF |

The plurality of flag triggers 240 of an SLE characterizing an entry having a greater degree of relevance includes more flag triggers having the triggering status than an SLE characterizing an entry having a lesser degree of relevance. In the specific examples of SLEs above fore one specific embodiment, more "1" bits are included in SLEs characterizing entries that have fewer "x" values ("don't care"s).

Construction of a specific embodiment may be simplified if all flag triggers having the triggering status in a particular SLE are consecutive and appear on a rightmost side or a leftmost side. Other embodiments with nonconsecutive flag triggers having the triggering status and do not appear on the right most side or the left most side are also practical.

Assuming that a particular flag trigger has the triggering status and a particular flag has the non-triggered status, the flag trigger is associated with the flag if a signal sent from the flag trigger prompting the status of the flag to change from the non-triggered status to the triggered status. Similarly, assuming that a particular flag trigger has the triggering status and a particular flag has the non-triggered status, the flag trigger is not associated with the flag if a signal sent from the flag trigger does not cause the status of the flag to change from the non-triggered status to the triggered status.

A trigger array holding an SLE characterizing an entry having a greater degree of relevance includes flag triggers having the triggering status associated with at least every flag of the plurality of flags 230 associated by flag triggers included in a trigger array holding an SLE characterizing an entry having a lesser degree of relevance, and another flag. In the specific examples of SLEs above for one specific embodiment, an SLE characterizing an entry with fewer "x" values ("don't care"s) has "1" bits in every column that has a "1" bit included in an SLE characterizing an entry with more "x" values ("don't care")s. In one embodiment implementing the above SLE examples, a flag is associated with all flag triggers in the same column as the flag.

In other embodiments, the plurality of trigger arrays 220 may be any logical or physical structure that supports the plurality of flag triggers 240. In other embodiments, the plurality of flag triggers 240 may be any logical or physical structure that holds values indicating whether or not the plurality of flags 230 should be triggered. In other embodiments, the plurality of flags 230 may be any logical or physical structure that holds a logical value indicating whether a triggering signal has been received from the plurality of flag triggers 240.

Figure 3:
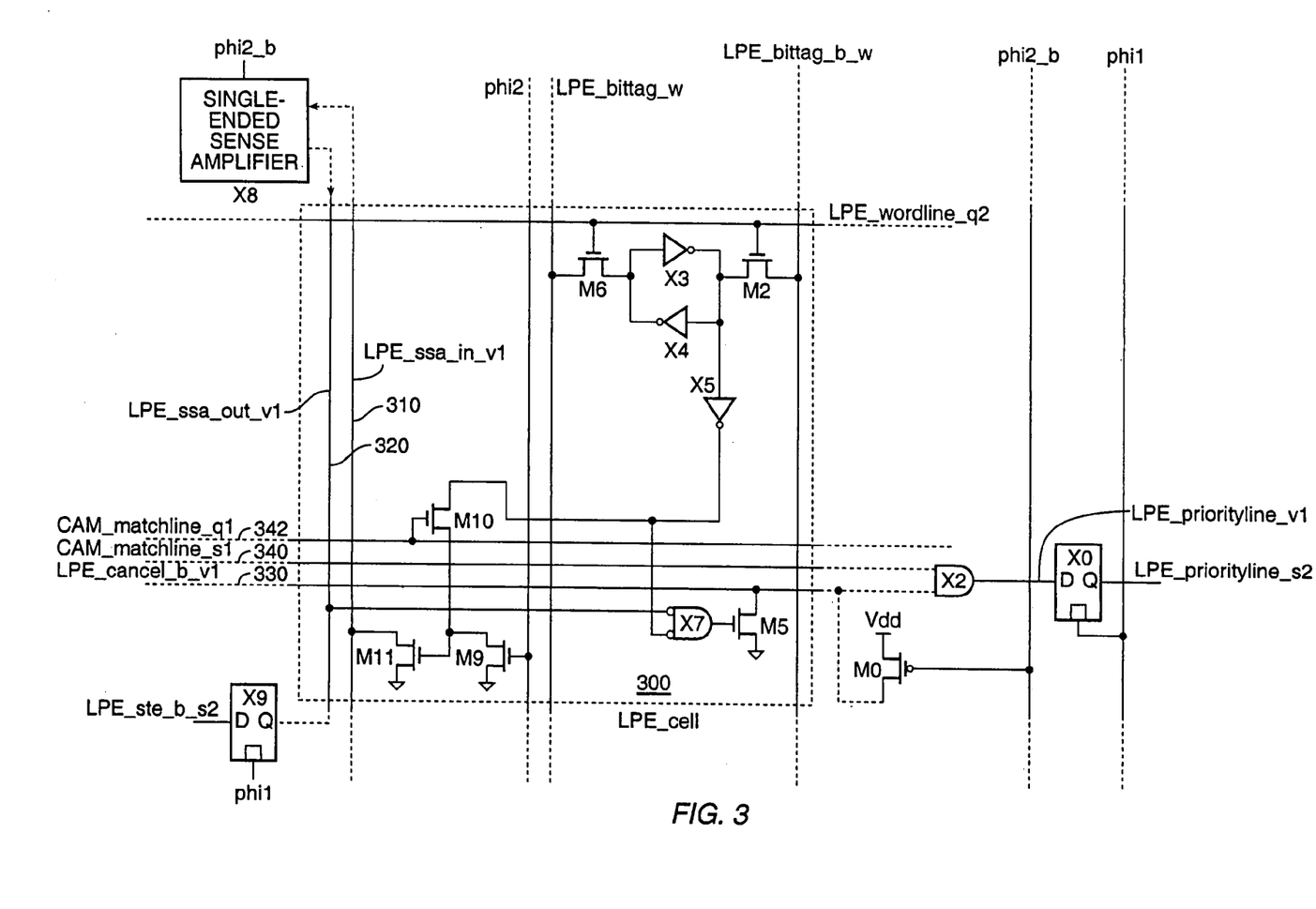
FIG. 3 is a logic diagram showing a flag trigger and a flag shown in FIG. 2.

FIG. 3 shows one embodiment of a flag trigger having one of a triggering or non-triggering status. In one embodiment, 32 LPE cells 300 are included in each trigger array to comply with an IP address prefix that includes as many as 32 bits according to Ipv4. In another embodiment, 128 LPE cells 300 are included in each trigger array to comply with Ipv6 (internet Protocol Version 6) which includes 128 bits in the IP address.

The LPE cell 300 uses a 2-phase clock, driven by a clock phi1 and a clock phi2. A precharge phase occurs when the clock phi2 is high and the clock phi1 is low. During the precharge phase, a transistor M9 turns on and discharges both a gate of a transistor M11 and a source of a transistor M10. A signal phi2_b is a complement of the clock phi2. The signal phi2_b precharges an input line 310 of a single-ended sense amplifier X8 to a voltage Vdd/2 and an output line 320 of a single-ended sense amplifier X8 to a voltage Vdd. The output line 320 acts as the flag in this embodiment. In this embodiment, the non-triggered status of the flag is a voltage at or near the precharge voltage Vdd of the output line 320, and the triggered status of the flag is a voltage near the ground voltage. Precharging the output line 320 causes a gate of a transistor M5 to be at a ground voltage. The signal phi2_b turns on a transistor M0 and precharges a cancel line 330 to the voltage Vdd.

An evaluation phase occurs when the clock phi1 is high and clock phi2 is low. An inverter X3 and an inverter X4 form an SRAM cell. The SRAM cell acts as the flag trigger in this embodiment. In this embodiment, the SRAM cell has the triggering status if the SRAM cell holds a "1" value at an input of the inverter X3, and the non-triggering status if the SRAM cell holds a "0" value at an input of the inverter X3. A match line 340 carries the matching status, a high voltage in this embodiment. A gated match line 342 carries the matching status like the match line 340, but is AND'ed with the clock ph. The gated match line 342 turns on the transistor M10 while the clock phi1 is high and corresponding entry has a matching status. The four possible combinations will now be discussed for a flag trigger having a triggering/non-triggering status and a flag having a triggered/non-triggered status.

Case 1

"Flag Trigger has Triggering Status and Flas has the Non-Triggered Status"

A voltage on the gate of the transistor M11 rises, and the transistor M11 drives a voltage on the input line 310 to the ground voltage. A small voltage drop on the input line 310 causes the single-ended sense amplifier X8 to quickly drive the output line 320 to the ground voltage, changing the flag from the non-triggered status to the triggered status.

Case 2

"Flag Trigger has Non-Triggering Status and Flag has Triggered Status"

This case indicates that the current flag trigger did not cause the flag to change from the non-triggered status to the triggered status. Another flag trigger having the triggering status associated with the flag must have caused the flag to change from the non-triggered status to the triggered status. Hence, another trigger array characterizing another matching entry must have a greater relevance than the matching entry characterized by the current trigger array including the current flag trigger. The transistor M5 is turned on and the cancel line 330 is driven to the ground voltage. A device X2 changes the status of the entry characterized by the current trigger array from the matching status to the non-matching status.

Case 3

"Flag Trigger has Triggering Status and Flag has Triggered Status"

This case indicates that the current flag trigger caused or helped to cause the flag to change from the non-triggered status to the triggered status. In addition to the current flag trigger, another flag trigger having the triggering status and included in another trigger array associated with the flag may have helped change the current flag from the non-triggered status to the triggered status. But there is no indication that the matching entry characterized by the current trigger array has less relevance than the matching entry characterized by the different trigger array, and no reason to change the matching status of the current entry to the non-matching status. Transistor M5 remains off and the matching status carried by the match line 340 propagates through the device X2.

Case 4

"Flag Trigger has Non-Triggering Status and Flag has Non-Triggered Status"

This case indicates that neither the current flag trigger nor any flag trigger associated with another trigger array characterizing another matching entry has prompted the current flag to change from the non-triggered status to the triggered status. Thus, there is no indication of an existence of another trigger array characterizing another matching entry having a greater relevance. Transistor M5 remains off and the matching status carried by the match line 340 propagates through the device X2.

Other circuit elements in FIG. 3 are a device X0 and device X9. The device X0 forwards the remaining match line having a matching status on to the memory 130. The device X9 forwards a bitwise negated SLE to an extra level of circuitry. The device X9 allows aggregation of multiple blocks of circuitry to form a much larger table of entries.

Figure 4:
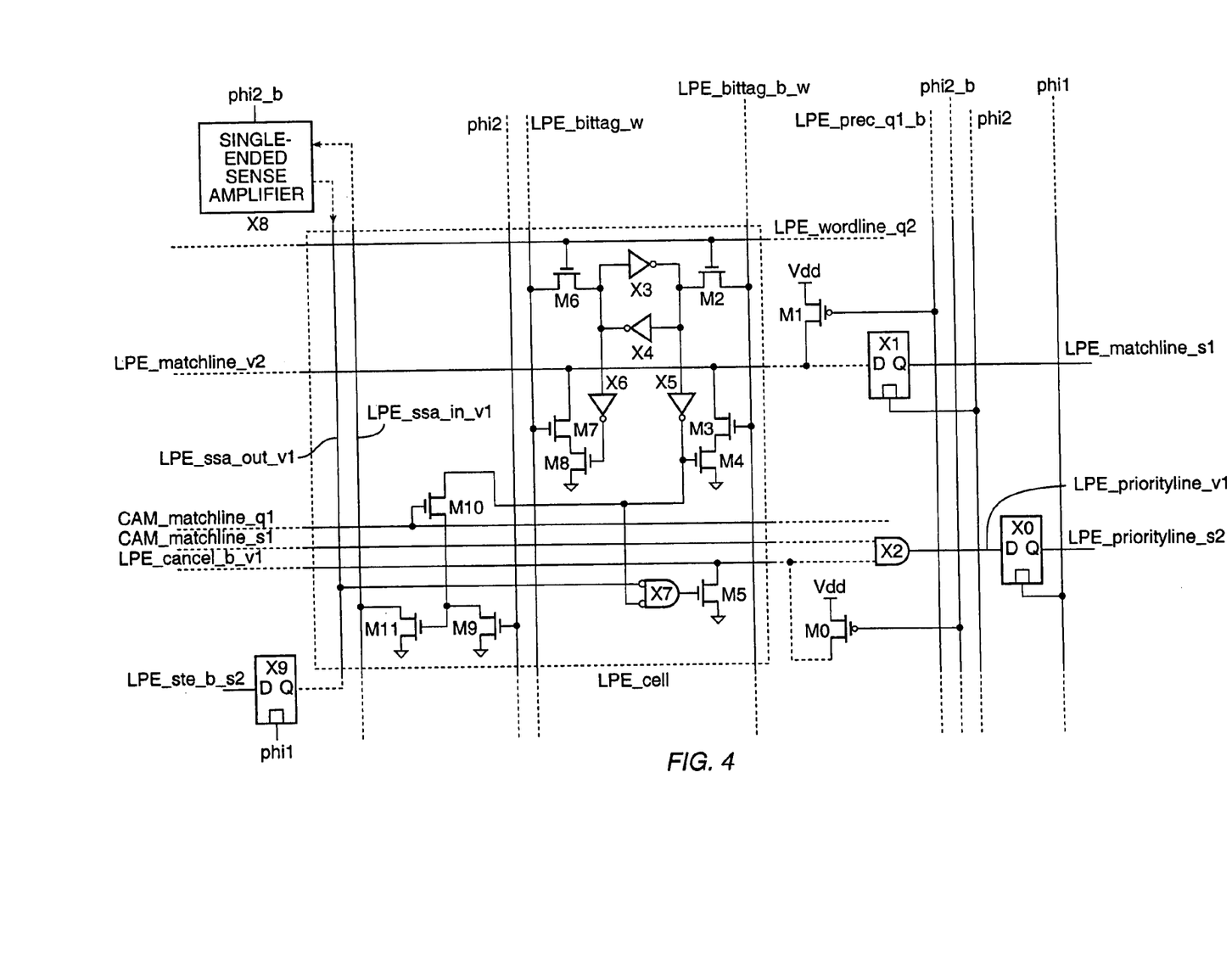
FIG. 4 is a logic diagram showing another embodiment of a flag trigger, including find circuitry.
Figure 5:
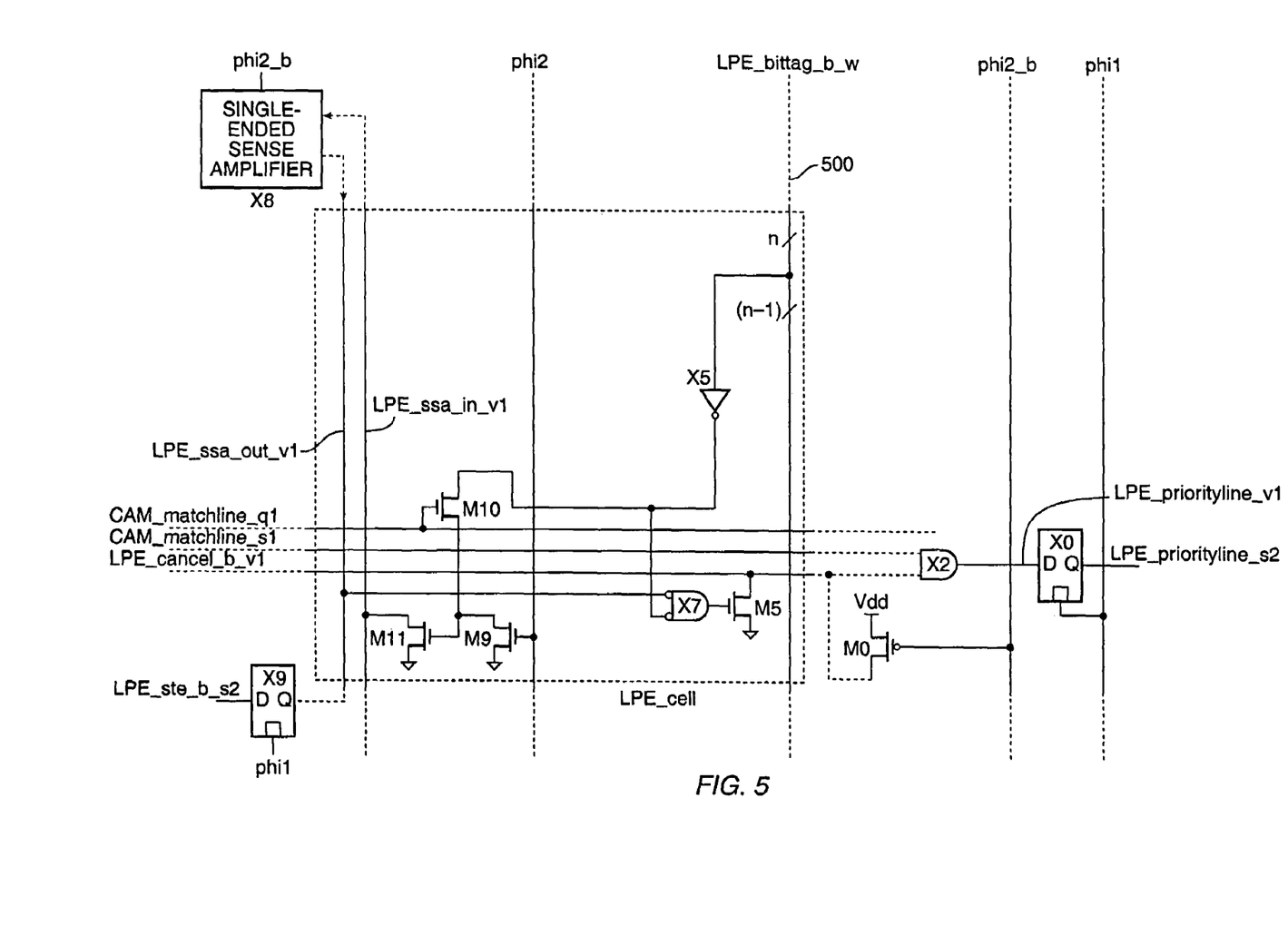
FIG. 5 is a logic diagram showing another embodiment of a flag trigger that locates the flag trigger away from other circuitry.
Figure 6:
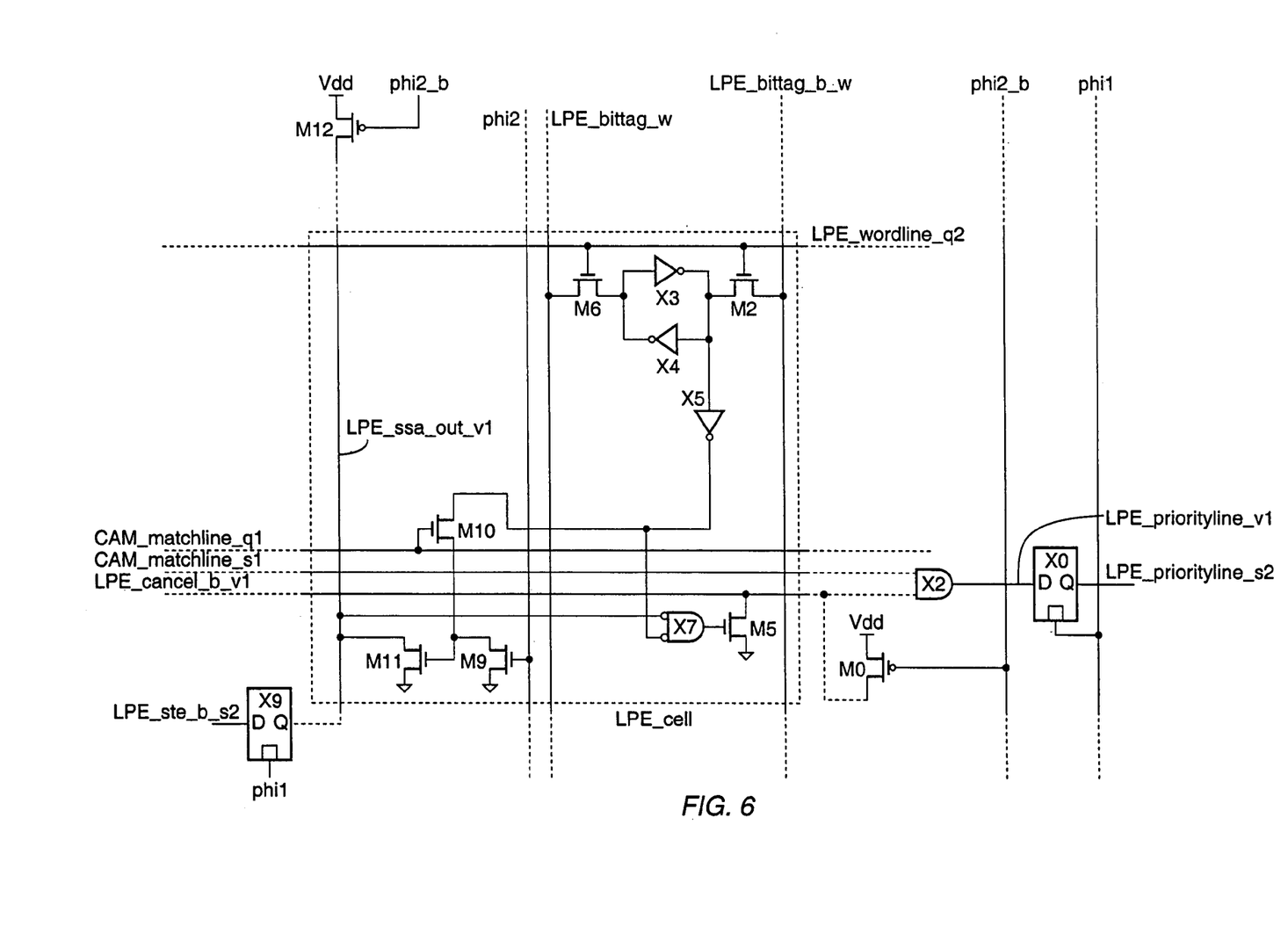
FIG. 6 is a logic diagram showing another embodiment of a flag.

FIG. 4 shows another embodiment of a flag trigger including circuitry for finding a particular trigger array from the plurality of trigger arrays 220. The find circuitry includes transistors M1, M3, M4, M7 and M8; and devices X1 and X6. The find circuitry allows the control unit 140 to delete an entry by helping the control unit 140 to find the entry to be deleted. To delete a particular entry, the control unit 140 submits the IP address prefix to the CAM 110 and the prefix's SLE to the LPE 120. The control unit 140 finds the entry to delete by checking for a match from both the CAM 110 and LPE 120. Other embodiments take advantage of other voltages, other devices, and other terminals of devices.

Figure 7:
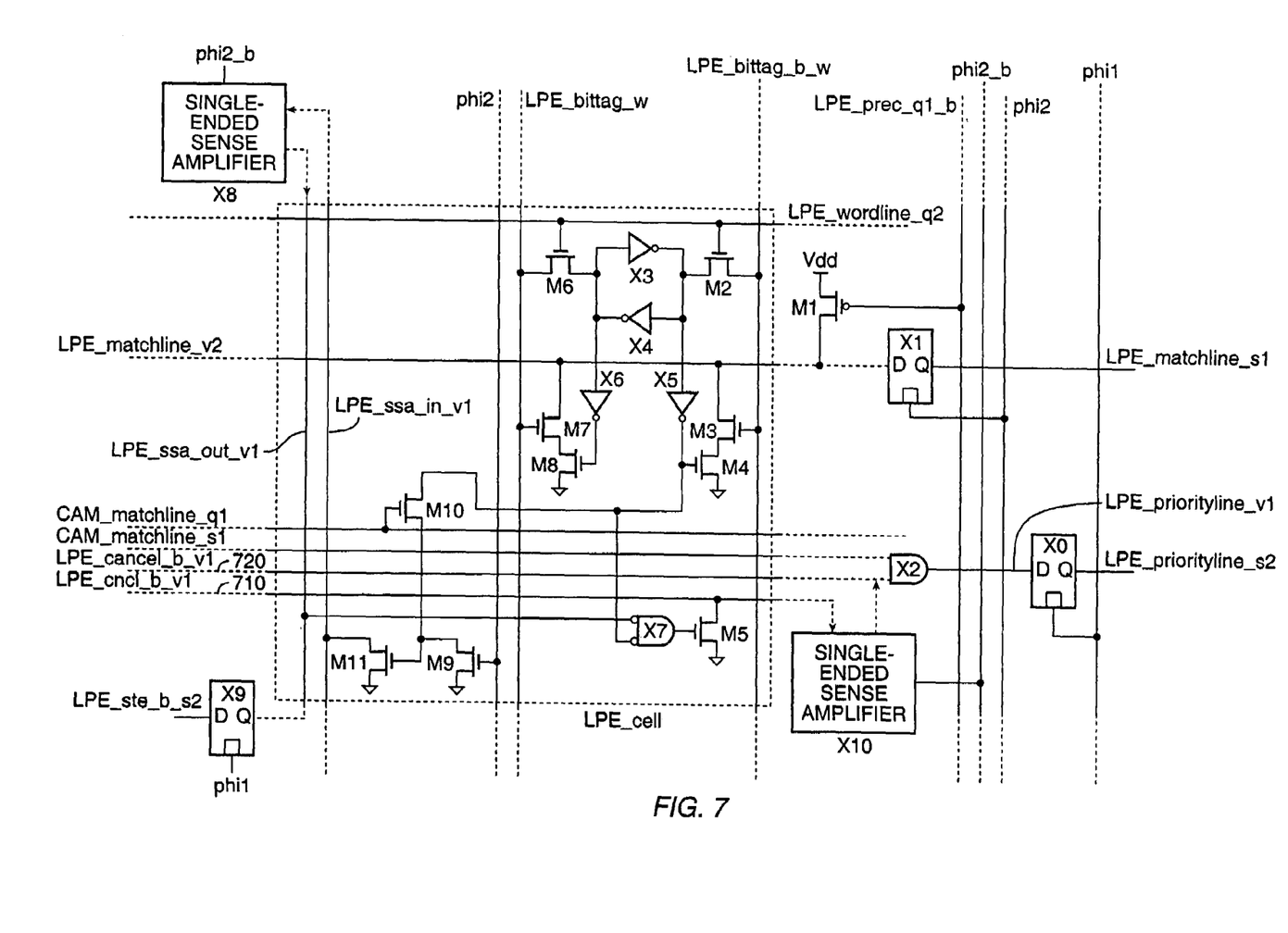
FIG. 7 is a logic diagram showing another embodiment of a flag trigger that includes different circuitry for receiving a signal to change a matching status to a non-matching status.

FIG. 7 shows an embodiment that replaces the transistor M0 with a single-ended sense amplifier X10 and splits the cancel line 330 into an input cancel line 710 and an output cancel line 720. During the precharge phase, the single-ended sense amplifier X10 precharges the input cancel line 710 to the voltage Vdd/2 and the output cancel line 720 to the voltage Vdd. During the evaluation phase, the transistor M5 starts to lower the voltage on the input cancel line 710. The single-ended sense amplifier X10 detects a slight voltage drop in the input cancel line 710 and quickly drives the output cancel line 720 to the ground voltage. Other embodiments take advantage of other voltages, other devices, and other terminals of devices.

Another embodiment uses a sense amplifier to sense a signal prompting a matching status to change to a non-matching status, when a trigger array includes many flag triggers. Many flag triggers mean that the excessive capacitance along the cancel line 330 will slow down voltage decrease of the cancel line 330. An embodiment used for Ipv6 that includes 128 flag triggers in the trigger array may respond more quickly with this embodiment.

While some embodiments of the present invention have been illustrated herein in detail, it should be apparent that modifications and adaptions to embodiments may occur to those skilled in the art without departing from the scope of the present invention as set forth in the following claims.

What is claimed is:

1. A router, comprising:
    a content addressable memory which stores Internet Protocol address prefixes in an order independent of lengths of the Internet Protocol address prefixes, wherein new entries are stored in the content addressable memory in random order; and
    an encoder coupled to the content addressable memory which stores a plurality of codes corresponding to the Internet Protocol address prefixes in the content addressable memory, and compares the codes corresponding to matching Internet Protocol address prefixes to find a longest matching Internet Protocol address prefix;
    wherein comparing the codes corresponding to matching Internet Protocol address prefixes to find a longest matching Internet Protocol address prefix involves using information in the code that signifies the degree of relevance of the match thereby allowing the encoder to find more relevant matches by removing less relevant matches from consideration;
    wherein finding more relevant matches by removing less relevant matches from consideration involves changing the matching status of the less relevant matches to a non-matching status.

2. The router of claim 1, further comprising:
    a memory coupled to the encoder, the memory for storing a port number corresponding to each Internet Protocol address prefix in the content addressable memory and other information for routing an incoming Internet Protocol packet.

3. The router for claim 1, wherein the encoder includes circuitry for finding one of the plurality of codes.

4. The router for claim 1, wherein the encoder includes circuitry for deleting one of the plurality of codes.

5. The router of claim 1, wherein each of the plurality of codes indicates a number of relevant bits in the corresponding Internet Protocol address prefix.

6. The router of claim 5, wherein among the codes corresponding to matching Internet Protocol address prefixes, a code indicating a highest number of relevant bits indicates the longest matching Internet Protocol address prefix.

7. The router of claim 5, wherein the code indicates up to 32 relevant bits in the corresponding Internet Protocol address prefix.

8. The router of claim 5, wherein the code indicates up to 128 relevant bits in the corresponding Internet Protocol address prefix.

9. A method for finding a longest matching prefix for an Internet Protocol address, comprising:
    storing Internet Protocol address prefixed in a content addressable memory in an order independent of lengths of the Internet Protocol address prefixes, wherein new entries are stored in the content addressable memory in random order; and
    comparing codes corresponding to matching Internet Protocol address prefixes in an encoder to find a longest matching Internet Protocol address prefix;
    wherein comparing the codes corresponding to matching Internet Protocol address prefixes in an encoder to find a longest matching Internet Protocol address prefix involves using information in the code that signifies the degree of relevance of the match thereby allowing the encoder to find more relevant matches by removing less relevant matches from consideration;
    wherein finding more relevant matches by removing less relevant matches from consideration involves changing the matching status of the less relevant matches to a non-matching status.

10. The method of claim 9, wherein the codes indicate numbers of relevant bits in the corresponding Internet Protocol address prefixes.

11. The method of claim 10, wherein among the codes corresponding to matching Internet Protocol addresses prefixes, the code indicating a highest number of relevant bits indicates the longest matching Internet Protocol address prefix.

12. A method of operating a router, comprising:
    receiving Internet Protocol address prefixes, wherein the Internet Protocol address prefixes are stored within a content addressable memory in random order;
    generating codes corresponding to a number of relevant bits in the Internet Protocol address prefix receiving a packet with a destination Internet Protocol address;
    comparing the destination Internet Protocol address to the Internet Protocol address prefixes to find the Internet Protocol address prefixes that match the destination Internet Protocol address;
    comparing the codes corresponding to the matching Internet Protocol address prefixes to find a longest matching Internet Protocol address prefix; and
    sending the packet to a port corresponding to the longest matching Internet Protocol address prefix;
    wherein comparing the codes corresponding to matching Internet Protocol address prefixes to find a longest matching Internet Protocol address prefix involves using information in the code that signifies the degree of relevance of the match thereby allowing the encoder to find more relevant matches by removing less relevant matches from consideration;
    wherein finding more relevant matches by removing less relevant matches from consideration involves changing the matching status of the less relevant matches to a non-matching status.

* * * * *